(12) United States Patent
Fu et al.

(10) Patent No.: US 9,529,999 B2
(45) Date of Patent: Dec. 27, 2016

(54) METHOD AND SYSTEM OF DISTINGUISHING BETWEEN HUMAN AND MACHINE

(71) Applicant: Alibaba Group Holding Limited, Grand Cayman (KY)

(72) Inventors: Yingfang Fu, Beijing (CN); Yudong Zhang, Hangzhou (CN); Zhenyuan Zhang, Hangzhou (CN); Jian Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 2 days.

(21) Appl. No.: 14/303,530

(22) Filed: Jun. 12, 2014

(65) Prior Publication Data
US 2014/0373139 A1  Dec. 18, 2014

(30) Foreign Application Priority Data

Jun. 13, 2013  (CN) .......................... 2013 1 0233809

(51) Int. Cl.
*G06F 21/55* (2013.01)
*H04L 29/06* (2006.01)

(52) U.S. Cl.
CPC ......... *G06F 21/552* (2013.01); *H04L 63/1408* (2013.01); *G06F 2221/034* (2013.01); *H04L 63/10* (2013.01); *H04L 63/1425* (2013.01); *H04L 63/1458* (2013.01)

(58) Field of Classification Search
CPC ............. H04L 63/1408; H04L 63/1458; H04L 63/1425; H04L 63/10
See application file for complete search history.

(56) References Cited

U.S. PATENT DOCUMENTS

| 5,047,962 A * | 9/1991 | Cornish ................... G07C 1/00 340/934 |
| 5,627,886 A | 5/1997 | Bowman |
| 8,387,145 B2 * | 2/2013 | Xie ....................... H04L 63/101 726/24 |

(Continued)

OTHER PUBLICATIONS

PCT Search Report and Written Opinion mailed Nov. 21, 2014 for PCT Application No. PCT/US14/42194, 8 Pages.

*Primary Examiner* — Morshed Mehedi
*Assistant Examiner* — Vance Little
(74) *Attorney, Agent, or Firm* — Lee & Hayes, PLLC

(57) ABSTRACT

A method and a system of distinguishing between a human and a machine are disclosed. The method includes: when a request for accessing a designated network service is received, recording information of the request which include a time of receiving the request and information of an access object that sends the request; computing a statistical value of requests sent by the access object in real time based on a record; and determining the access object to be abnormal when the statistical value of the requests sent by the access object falls outside a predetermined normal range. The disclosed system of distinguishing between a human and a machine includes a recording module, a computation module and a determination module. Identification between humans and machines using the disclosed scheme is difficult to be cracked down and can improve an accuracy rate of human-machine identification.

18 Claims, 8 Drawing Sheets

(56) References Cited

U.S. PATENT DOCUMENTS

| | | | |
|---|---|---|---|
| 8,646,077 B1* | 2/2014 | Shen | G06F 21/6209 |
| | | | 709/206 |
| 2006/0028996 A1* | 2/2006 | Huegen | H04L 63/126 |
| | | | 370/252 |
| 2008/0050018 A1 | 2/2008 | Koziol | |
| 2008/0295169 A1* | 11/2008 | Crume | H04L 63/1441 |
| | | | 726/22 |
| 2009/0138723 A1 | 5/2009 | Nyang et al. | |
| 2010/0192201 A1 | 7/2010 | Shimoni et al. | |
| 2010/0325706 A1 | 12/2010 | Hachey | |
| 2011/0072516 A1 | 3/2011 | Cohen et al. | |
| 2011/0166916 A1 | 7/2011 | Inbar | |
| 2011/0320816 A1 | 12/2011 | Yao et al. | |
| 2012/0033859 A1 | 2/2012 | Misra | |
| 2013/0014235 A1 | 1/2013 | Antypas, III | |
| 2013/0067573 A1 | 3/2013 | Champion et al. | |

\* cited by examiner

METHOD AND SYSTEM OF DISTINGUISHING BETWEEN HUMAN AND MACHINE

CROSS REFERENCE TO RELATED PATENT APPLICATION

This application claims foreign priority to Chinese Patent Application No. 201310233809.4 filed on Jun. 13, 2013, entitled "Method of Identifying between Human and Machine, and Associated Human-Machine Identification System", which is hereby incorporated by reference in its entirety.

TECHNICAL FIELD

The present disclosure relates to the field of computer systems, and more particularly to methods and systems for distinguishing between a human and a machine.

BACKGROUND

With the popularity of the Internet, various Internet services, such as electronic commerce services, free electronic mail services and free resource download services, etc., have become a part of people's daily lives. Nevertheless, resources for these human-oriented services are often abusively occupied by malicious computer programs to produce an enormous amount of network junk, affecting the network experience of legitimate users and threatening the security of the network services.

CAPTCHA (Completely Automated Public Turing test to tell Computers and Humans Apart) is a system that employs a security measure of identity authentication using a challenge-response approach for realizing identification between a human and a machine, i.e., identifying whether a request for an Internet service is sent by an operation of a user (referred to as a human) or by a malicious program in a computer (referred to as a machine). An operating mechanism of CAPTCHA is as follows: a dedicated server is responsible for generating and evaluating a CAPTCHA test; when a user uses a certain Internet service that needs authentication, the server provides a test to the user; the user submits a result of the test to the server upon completion; and the server evaluates the result of the test and determines whether the user passes the test.

Currently, the techniques primarily adopted by CAPTCHA technology include a text CAPTCHA technique, an image CAPTCHA technique and an audio CAPTCHA technique. These three CAPTCHA techniques possess different characteristics due to different aspects of AI fields.

A text CAPTCHA distinguishes between a human and a machine through a difference between humans and machines in character recognition using an authentication code technology (e.g., distorting a text or character to distinguish between a human and a machine), thus preventing malicious registrations and logins by computer programs to a certain extent. However, with the development of character segmentation and Optical Character Recognition (OCR) technologies, a majority of text CAPTCHAs have been cracked, and simple character recognition tests can no longer resist computer programs. Furthermore, a distorted text is also difficult for humans to recognize, leading to the poor experience of users.

An image CAPTCHA, which distinguishes differences between humans and machines in aspects such as image classification, target identification and common understanding, is generally independent of any specific language and without the need of a textual input from a user, thus being more difficult to be cracked. However, image CAPTCHAs need support of large databases and cannot be massively generated. In addition, the image CAPTCHAs are prone to attacks from machine learning algorithms.

An audio CAPTCHA, which distinguishes differences between humans and machines in voice recognition, plays one or more randomly selected numbers, alphabets and single words that are read by a person in random intervals, and adds a background noise to resist ASR attacks. However, the audio CAPTCHA is also prone to attacks from machine learning algorithms.

SUMMARY

The present disclosure provides a method and an associated system of distinguishing between humans and machines that are difficult to crack and are capable of enhancing a rate of distinguishing between humans and machines. This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

In order to solve the above problem, the present disclosure provides a human-machine identification method, which is applicable in a network service. This method includes:

when a request for accessing a designated network service is received, recording information of the request which includes a time of receiving the request and information of an access object that sends the request;

computing a statistical value of requests sent by the access object in real time based on a record; and determining the access object to be abnormal when the statistical value of the requests sent by the access object falls outside a predetermined normal range.

In one embodiment, the access object may include a terminal and/or a user that send(s) the request.

In an embodiment, the statistical value of the requests sent by the access object includes one or more request frequency values.

The statistical value falls outside the predetermined normal range when a request frequency value is greater than a corresponding request frequency threshold.

In an embodiment, the request frequency value is represented as the number of requests sent within a time window that has a configured time duration. A time of receiving the most recent request sent from the access object is set as an end time of the time window. Alternatively, the request frequency value is represented as a time duration used by a configured number of requests that are consecutively sent, and the configured number of requests includes the most recent request sent from the access object.

The request frequency values correspond to different configured time durations or different configured numbers of times, and respective number-of-times thresholds or time duration thresholds are also different.

In an embodiment, when the access object includes a terminal, the information of the request includes information of the terminal and a user that sent the request.

The statistical value associated with the requests sent by the terminal includes a value for a frequency of user appearance and/or a value for a frequency of user switching obtained from an analysis of users who send the requests via the terminal.

The statistical value falls outside the predetermined normal range when the value for the frequency of user appearance is greater than a corresponding threshold for the frequency of user appearance, and/or the value for the frequency of user switching is greater than a corresponding threshold for the frequency of user switching.

In an embodiment, the value for the frequency of user appearance is represented as the number of different users who send requests via the terminal within a time window having a configured time duration. The value for the frequency of user switching is represented as the number of times that users who send requests via the terminal are switched within a time window having a configured time duration, wherein an end time of the time window is a time of receiving the most recent request sent from the terminal.

In an embodiment, when the access object includes a user, the information of the request includes information of a terminal and the user that sent the request.

The statistical value associated with the requests sent by the user includes a value for a frequency of terminal appearance and/or a value for a frequency of terminal switching obtained from an analysis of terminals that are used by the user when sending the requests.

The statistical value falls outside the predetermined normal range when the value for the frequency of terminal appearance is greater than a corresponding threshold for the frequency of terminal appearance, and/or the value for the frequency of terminal switching is greater than a corresponding threshold for the frequency of terminal switching.

In an embodiment, the value for the frequency of terminal appearance is represented as the number of different terminals used by the user to send the requests within a time window that has a configured time duration. The value for the frequency of terminal switching is represented as the number of times that the user switches terminals to send the requests within a time window that has a configured time duration, wherein an end time of the time window is a time of receiving the most recent request sent by the user.

In an embodiment, the statistical value associated with the requests sent by the access object includes a value for a time interval between consecutive requests sent by the access object.

The statistical value falls outside the predetermined normal range when the value for the time interval is less than a corresponding time interval threshold.

In an embodiment, the consecutive requests sent by the access object are classified into different types based on whether the consecutive requests are sent by a same access object and/or whether the consecutive requests correspond to requests for a same network service. A time interval threshold is individually set up for each different type of consecutive requests.

In an embodiment, the method further includes:

when the access object includes a terminal, isolating the terminal while refraining from receiving a request from the terminal, and stopping to compute the statistical value associated with the requests sent from the terminal upon determining that a number of anomalies associated with the terminal reaches a predetermined number of anomalies, M, wherein M=1 or M>1; and when the access object includes a user, isolating the user, refraining from receiving a request from the user, and stopping to compute the statistical value associated with the requests sent from the user upon determining that a number of anomalies associated with the user reaches a predetermined number of anomalies, N, wherein N=1 or N>1.

In an embodiment, upon determining the access object to be abnormal, if the access object (e.g., a terminal and/or a user) has not been isolated, excluding request(s) sent from the access object prior to a current instance of anomaly when computing the statistical value of the requests sent from the access object in real time.

Correspondingly, the present disclosure further provides a system of distinguishing between humans and machines in a network service, which includes:

a recording module used for, each time when a request for accessing a designated network service is received, recording information of the request which include a time of receipt of the request and information of an access object that sends the request;

a computation module used for computing a statistical value of requests sent by the access object in real time based on a record; and a determination module used for determining the access object to be abnormal when the statistical value of the requests sent by the access object exceeds a predetermined normal range.

In one embodiment, the access object includes a terminal and/or a user that send(s) the request.

In an embodiment, when the access object includes a terminal, the statistical value of the requests sent by the access object, which is computed by the computation module in real time, includes one or more of the following statistical values:

one or more request frequency values, with the predetermined normal range being exceeded when a request frequency value is greater than a corresponding request frequency threshold;

a value for a frequency of user appearance obtained from an analysis of users who send requests via the terminal, with the predetermined normal range being exceeded when the value for the frequency of user appearance is greater than a corresponding threshold for the frequency of user appearance;

a value for a frequency of user switching obtained from the analysis of the users who send the requests via the terminal, with the predetermined normal range being exceeded when the value for the frequency of user switching is greater than a corresponding threshold for the frequency of user switching; and a value for a time interval between consecutive requests sent from the terminal, with the predetermined normal range being exceeded when the value for the time interval value is less than a corresponding time interval threshold.

In an embodiment, when the access object includes a user, the statistical value of the requests sent by the access object, which is computed by the computation module in real time, includes one or more of the following statistical values:

one or more request frequency values, with the predetermined normal range being exceeded when a request frequency value is greater than a corresponding request frequency threshold;

a value for a frequency of terminal appearance obtained from an analysis of terminals used by the user when sending requests, with the predetermined normal range being exceeded when the value for the frequency of terminal appearance is greater than a corresponding threshold for the frequency of terminal appearance;

a value for a frequency of terminal switching obtained from the analysis of the terminals used by the user when sending the requests, with the predetermined normal range being exceeded when the value for the frequency of terminal switching is greater than a corresponding threshold for the frequency of terminal switching; and a value for a time interval between consecutive requests sent from the user, with the predetermined normal range being exceeded when the value for the time interval value is less than a corresponding time interval threshold.

In an embodiment, the request frequency value is represented as the number of requests sent within a time window having a set time duration, and a time of receiving the most recent request sent from the access object is set as an end time of the time window. Alternatively, the request frequency value is represented as a time duration used by a set number of requests that are consecutively sent, and the set number of requests includes the most recent request sent from the access object.

The request frequency values correspond to different set time durations or different set numbers of times, and respective number-of-times thresholds or time duration thresholds are also different accordingly.

In an embodiment, when the access object includes a terminal, the consecutive requests sent by the access object are classified into different types based on whether the consecutive requests are sent by a same user and/or whether the consecutive requests correspond to requests for a same network service. A time interval threshold is individually set up for each different type of consecutive requests.

In another embodiment, when the access object includes a user, consecutive requests sent by the access object are classified into different types based on whether the consecutive requests are sent from a same terminal and/or whether the consecutive requests correspond to requests for a same network service. A time interval threshold is individually set up for each different type of consecutive requests.

In an embodiment, the system further includes: an isolation module used for, when the access object includes a terminal, isolating the terminal, refraining from receiving a request from the terminal, and stopping to compute the statistical value of the requests sent from the terminal upon determining that the number of anomalies associated with the terminal reaches a predetermined number of anomalies, M, wherein M=1 or M>1; and when the access object includes a user, isolating the user, refraining from receiving a request from the user, and stopping to compute the statistical value of the requests sent from the user upon determining that the number of anomalies associated with the user reaches a predetermined number of anomalies, N, wherein N=1 or N>1.

In an embodiment, upon determining the access object (i.e., the terminal and/or the user) to be abnormal and if the isolation module has not isolated the access object, the computation module excludes request(s) sent from the access object prior to a current instance of anomaly when computing the statistical value of the requests sent from the access object in real time.

The scheme for distinguishing between a human and a machine provided by the present disclosure is able to effectively identify a malicious computer program, and is difficult to be cracked as compared with the existing text, image and audio CAPTCHA techniques. A rate of distinguishing between humans and machines is improved, thus effectively ensuring the security of network services of a system.

DETAILED DESCRIPTION

In order to facilitate a clearer understanding of the purpose, the technical scheme and the advantages of the present disclosure, the present disclosure will be described in detail hereinafter with reference to the accompanying drawings. It should be noted that the embodiments of the present disclosure and features in the embodiments may be mutually and arbitrarily combined when no conflict therebetween exists.

In a typical configuration of the present disclosure, an apparatus in an associated system may include one or more of central processing units (CPU), input/output interfaces, network interfaces and internal storage.

The internal storage may include a form of computer readable media, e.g., a non-permanent storage device, random-access memory (RAM) and/or a nonvolatile internal storage, such as read-only memory (ROM) or flash RAM. The internal storage is an example of computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The existing CAPTCHA technology employs identity authentication using a challenge-response approach for telling humans and machines apart. The present disclosure adopts a different concept, and distinguishes between a human and a machine through a statistical approach by taking advantages of differences between a user and a malicious program in a computer with respect to methods of sending requests.

First Embodiment

Studies have shown that the number of requests sent by a user to a network service is relatively small within a limited time whereas a malicious computer program sends a large amount of requests in a short period of time in order to achieve the purpose of an attack. This embodiment analyzes information of requests sent from a terminal to achieve identification between a human and a machine based on this difference.

Figure 1:
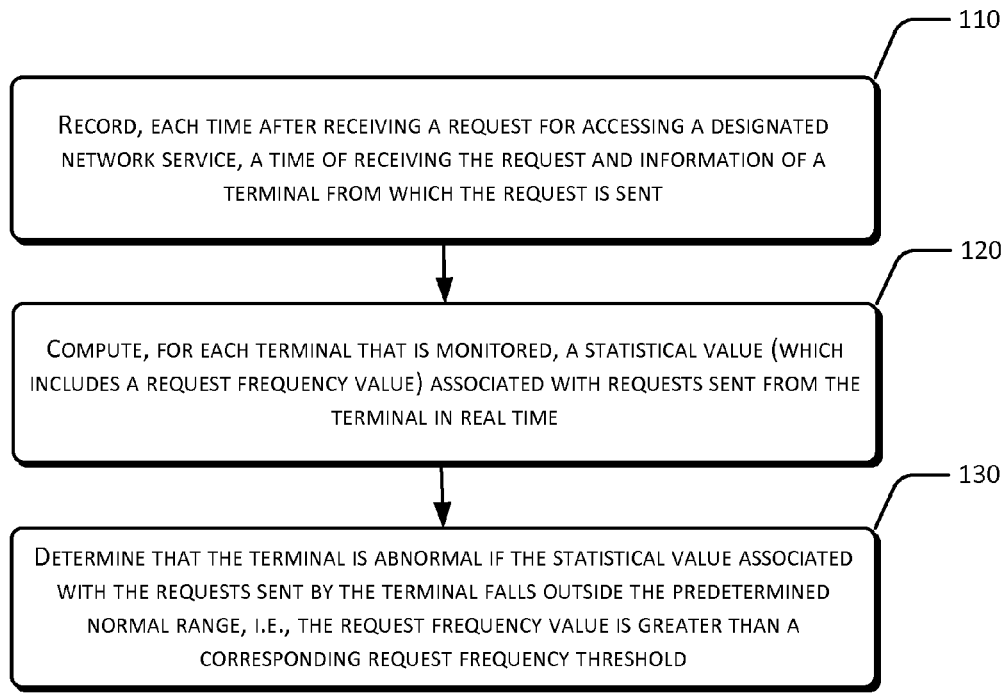
FIG. 1 is a flowchart illustrating a method of distinguishing between a human and a machine in accordance with a first embodiment of the present disclosure.

This example method of distinguishing between a human and a machine is applicable in a service network. The service network is used for providing network services to a terminal, and can be one or more website systems or network platforms, etc. As shown in FIG. 1, the method of distinguishing between a human and a machine includes:

Block 110 records, each time after receiving a request for accessing a designated network service, a time of receiving the request and information of a terminal from which the request is sent.

All types of network services may be set up as the designated network service, and the service network records all requests for accessing network services. Alternatively, only some types of network services, such as a network service that occupies a greater amount of resources or has a higher security level, may be set as the designated network service, and the service network records requests for accessing these types of network services.

A terminal that sends the request can be determined by the service network using terminal identification technologies, e.g., can be identified using a MAC address or other hardware information (such as hardware information of an I/O layer) and/or software information that can uniquely identify the terminal that has been submitted in the request. Alternatively, the terminal may be requested to first register in a server that provides digital signatures and/or issues certificates to obtain a signature or a certificate associated with identification of the terminal. Based on the signature or the certificate reported in the request, the service network identifies the terminal according to the identification of the terminal in the signature and the certificate upon verifying that the signature and the certificate are legitimate.

Block 120 computes, for each terminal that is monitored, a statistical value (which includes a request frequency value) associated with requests sent from the terminal in real time.

All terminals except terminals that have been isolated may be monitored. Alternatively, some terminals thereof may be selected for monitoring. For example, in order to reduce cost, terminals may be divided into a number of groups (e.g., grouping according to identifications of the terminals, regions where the terminals are located, types of the terminals, etc.), and different groups of terminals are monitored in different periods of time. In another example, only some types of terminals are monitored based on primary types of terminals that are attacked, e.g., monitoring requests from computers only but not requests from mobile phones, etc.

A request frequency value reflects a degree of how frequently requests are sent, which may be represented as a number of times of sending within a set time period, or a time duration used by a set number of times of sending.

In an embodiment, the request frequency value may be represented as a number of requests that are sent within a time window having a configured time duration. The time of receiving the most recent request sent from a corresponding terminal is set as an end time of the time window. In other words, each time when a request of the terminal is recorded, an upper edge of the time window is moved to the time of receiving that request, and the number of requests that are sent by the terminal within the time window is computed.

In an embodiment, the request frequency value may also be represented as a time duration used for sending a set number of consecutive requests. The set number of consecutive requests includes the most recent request sent by the corresponding terminal. At this time, when each request sent by the terminal is recorded, the time duration for the terminal to send consecutive L number of requests (which includes the request) is calculated.

It should be noted that a specific representation of the request frequency value is not limited to the above two types. For example, fixed time windows may be utilized to calculate the number of requests sent by a terminal. These fixed time windows may be divided in advance. Alternatively, the time of receiving the first request sent from the terminal can be set as a start time of a first time window, with a second time window being initiated immediately after the end of the first time window, etc. Generally, a statistical value is computed after a new request is received. However, when fixed time windows are used, a statistical value may be computed after the end of a time window.

Specifically, multiple request frequency values are used in this embodiment. These request frequency values correspond to different set time duration(s) or number(s) of times, and corresponding thresholds for number of times or thresholds for time duration are different accordingly. For example, given two request frequency values, a set time duration for a first request frequency value is ten minutes with a corresponding threshold for the number of times to be six hundred times, and a set time duration for a second request frequency value is six hours with a corresponding threshold for the number of times to be ten thousand and eight hundred times. Although two request frequency values are computed in this example, three, four, five, six or more request frequency values may be computed. This is because some malicious computer programs keep sending requests in a very high rate. For some other malicious computer programs, the rate of sending requests within a short period of time is not especially high, and is even close to a peak request rate of a user. However, when the time period is longer, the request rate thereof is not achievable by a user.

Block 130 determines that the terminal is abnormal if the statistical value associated with the requests sent by the terminal falls outside the predetermined normal range, i.e., the request frequency value is greater than a corresponding request frequency threshold.

If the terminal is determined to be abnormal, it may indicate that a malicious computer program is using the terminal to send out requests. In this embodiment, once the terminal is determined to be abnormal, the terminal is isolated, requests sent by the terminal will not be accepted and statistical values associated with the requests sent by the terminal will not be computed. However, in some other embodiments, from the perspective of avoiding false negatives, tolerance for a certain degree of abnormality may be allowed. The terminal may be isolated after determining that the terminal is abnormal for a number of times. The number of times allowed can be set in advance.

In an embodiment, after determining that the terminal is abnormal and if the terminal has not been isolated, request(s) sent by the terminal prior to this anomaly is/are not to be counted in the real-time computation of the statistical value associated with requests sent by the terminal (the number of anomalies has not been reached). For example, if a request frequency value is calculated based on a moving time window, when a next request of the terminal is received after a certain request sent by the terminal is received and the terminal is determined to be abnormal, a time window, which has an end time as the time of receiving the next request, may include request(s) that is/are previously sent by the terminal. If the previously sent request(s) is/are counted, the terminal may be easily be determined as abnormal repeatedly, thus being unfavorable to avoid false negatives.

Second Embodiment

This embodiment is also based on the difference that the number of requests sent by a user to the service network is relatively fewer and a malicious program sends a large number of requests in order to achieve the purpose of an attack. However, this embodiment achieves identification between a human and a machine by computing statistics associated with information of requests sent by a user, the details of which being the same as that of the first embodiment will not be described in detail again.

Figure 2:
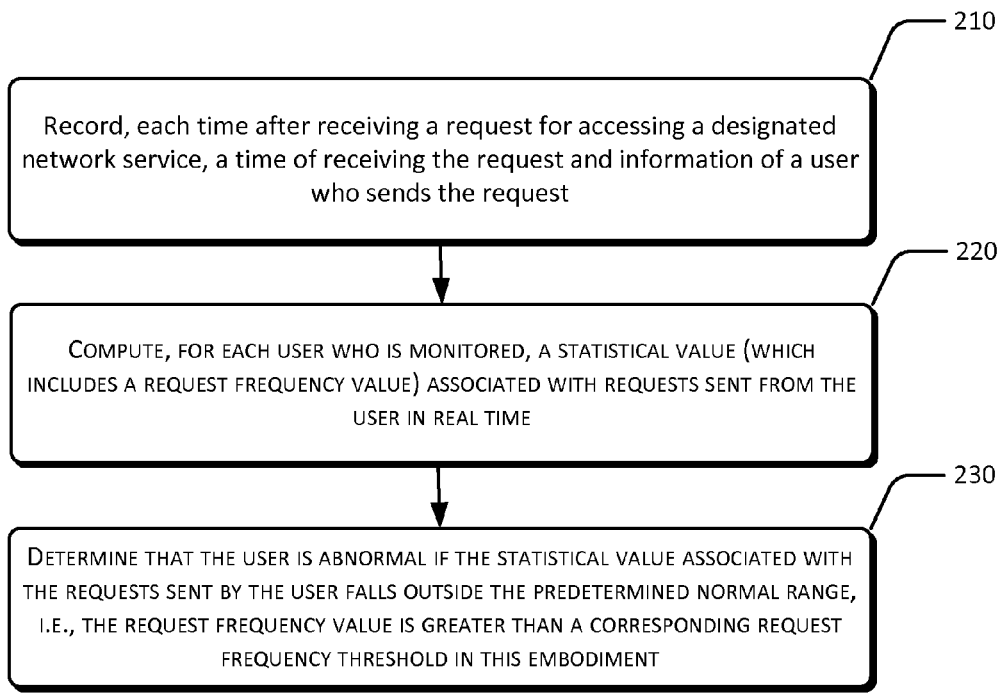
FIG. 2 is a flowchart illustrating a method of distinguishing between a human and a machine in accordance with a second embodiment of the present disclosure.

This example method of distinguishing between a human and a machine is applicable in a service network. As shown in FIG. 2, the human-machine identification method includes:

Block 210 records, each time after receiving a request for accessing a designated network service, a time of receiving the request and information of a user who sends the request.

For the user who sends the request, the service network may identify the user based on login information such as a user name, a user account, etc., that is submitted in the request. Similar to identification of a terminal, the service network may verify a signature or a certificate for user identification that is contained in the request, and identify the user based on the user identification in the signature or the certificate.

Block 220 computes, for each user that is monitored, a statistical value (which includes a request frequency value) associated with requests sent by the user in real time.

In this embodiment, all users except users that have been isolated may be monitored. In other alternative embodiments, some users thereof may be selected for monitoring. For example, in order to reduce costs, users may be divided into a number of groups (e.g., grouping according to identifications of the users, regions where the users are located, types of the users, etc.), and different groups of users are monitored in different periods of time, or only some groups of users are monitored, etc.

For specific representation and computation of request frequency values, this embodiment is basically the same as the first embodiment, only in that statistics associated with requests sent by a terminal is changed to statistics associated with requests sent by a user, and the details of which are not redundantly described herein.

Block 230 determines that the user is abnormal if the statistical value associated with the requests sent by the user falls outside a predetermined normal range, i.e., the request frequency value is greater than a corresponding request frequency threshold in this embodiment.

If a user is determined to be abnormal, it may indicate that a malicious computer program is using an account of the user to send out requests. Similar to the first embodiment, after the user is determined to be abnormal for a number of times that reach a predefined number of anomalies, the user is isolated, requests sent by the user will not be accepted and statistical values associated with the requests sent by the user will not be computed. The number of anomalies may be one time or multiple times. Similarly, after determining that the user is abnormal and if the user has not been isolated, request(s) sent by the user prior to this anomaly is/are not to be counted in the real-time computation of the statistical value associated with requests sent by the user.

Third Embodiment

Studies have shown that a terminal can only be operated by a limited number of users in a limited period of time in practice. If a terminal is found to be used by a large number of users, a determination may be made that the terminal is operated by a malicious computer program.

Figure 3:
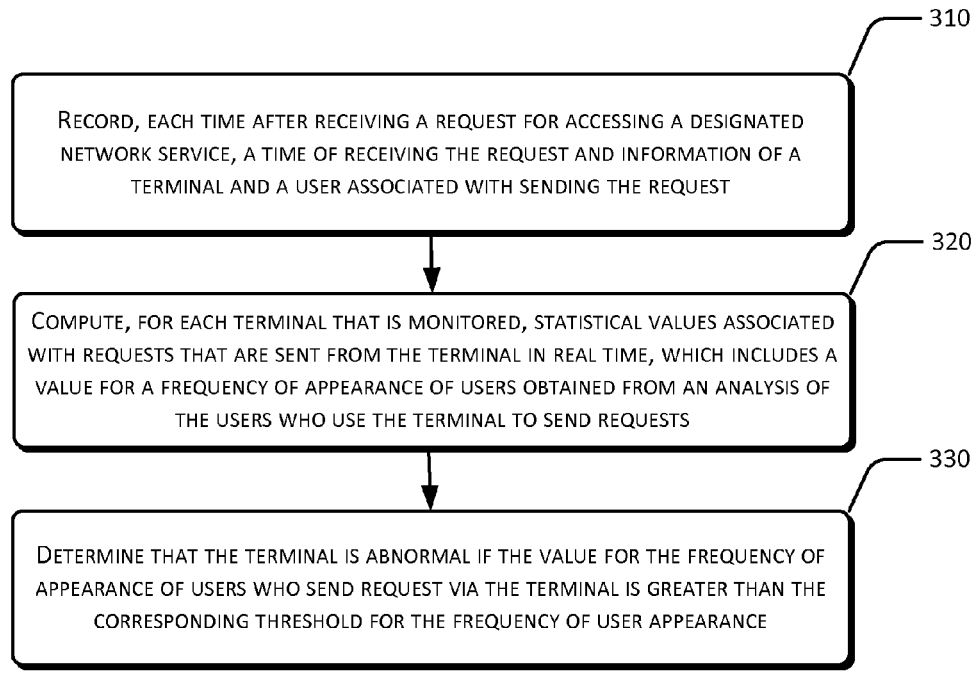
FIG. 3 is a flowchart illustrating a method of distinguishing between a human and a machine in accordance with a third embodiment of the present disclosure.

This example method of distinguishing between a human and a machine achieves identification between a human and a machine by using a value for a frequency of appearance of users associated with requests that are sent by a terminal as shown in FIG. 3, which includes:

Block 310 records, each time after receiving a request for accessing a designated network service, a time of receiving the request and information of a terminal and a user associated with sending the request.

This block is basically the same as block 110 of the first embodiment, and the only difference is to record the user who sends the request at the same time when recording the terminal that sends the request.

Block 320 computes, for each terminal that is monitored, statistical values associated with requests that are sent from the terminal in real time, which includes a value for a frequency of appearance of users obtained from an analysis of the users who use the terminal to send requests.

In an embodiment, a value for a frequency of appearance of users is expressed by the number of different users who use the terminal to send requests within a time window that has a set time duration. An end time of the time window is the time of receiving the most recent request sent by the terminal. For example, if the set time duration is ten seconds, and users A, B, A, B, C and D send requests via a same terminal within ten seconds, a value for a frequency of user appearance is four. If a corresponding threshold for the frequency of user appearance is less than or equal to three, the terminal is determined to be abnormal. Otherwise, the terminal is determined to be normal. Although a user who is monitored needs to be a real-name user, an anonymous user may be treated as a specific user for analysis when computing a value for a frequency of user appearance corresponding to a terminal and a value for a frequency of user switching that will be described hereinafter. The present disclosure is not limited to the above representations. For example, a time window may be used in form of a fixed time window.

There may be multiple values for the frequency of user appearance as described above. Different time durations may be set for different values of frequencies of user appearance, and corresponding thresholds for the number of users can be different. Moreover, similar to a request frequency value, a value for a frequency of user appearance may be expressed by a time duration that has lapsed for the number of users who send requests via the terminal reaching a set number of users.

Block 330 determines that the terminal is abnormal if the value for the frequency of appearance of users who send request via the terminal is greater than the corresponding threshold for the frequency of user appearance.

Upon determining that the terminal is abnormal, the process of isolation in the first embodiment may be used.

This embodiment may include an alternative. In this alternative, the value for the frequency of user appearance is replaced by a value for a frequency of user switching that is obtained from an analysis of the users who send the requests via the terminal. The value for the frequency of user switching may be represented as the number of times that the users who send the requests via the terminal are switched within a time window that has a set time duration. An end time of the time window is the time of receiving the most recent request sent by the users. For example, if the set time duration is ten seconds and users A, B, A, B, C and D send requests via a same terminal within the ten seconds, the value for the frequency of user switching corresponding to that terminal is five. If a corresponding threshold for the frequency of user switching is less than or equal to four, the terminal is determined to be abnormal. A difference between a value for a frequency of user switching and a value for a frequency of user appearance is that a malicious program may use a relatively few number of user accounts to send requests via a same terminal, but may frequently switch among these user accounts, which is also a scenario different from operations of users.

Fourth Embodiment

Studies have shown that a user can only operate a limited number of terminals in a limited period of time in practice. If a user is found to operate a large number of terminals, a determination may be made that a malicious computer program is behind the operations.

Figure 4:
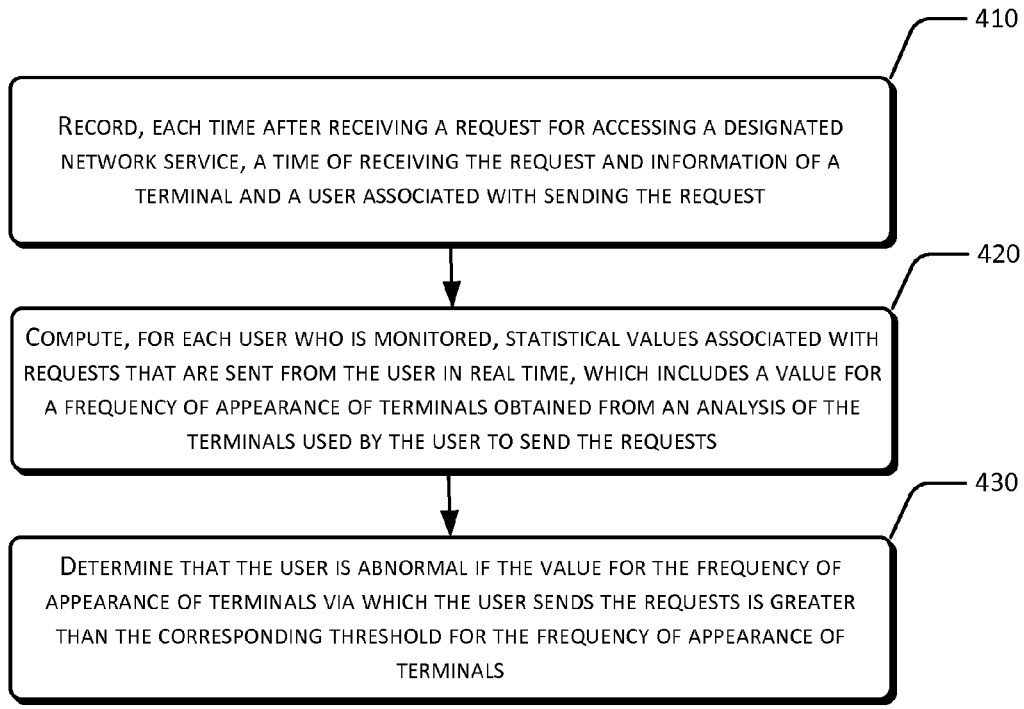
FIG. 4 is a flowchart illustrating a method of distinguishing between a human and a machine in accordance with a fourth embodiment of the present disclosure.

This example human-machine identification method achieves distinguishing between a human and a machine using a value for a frequency of appearance of terminals via which a user send requests as shown in FIG. 4, which includes:

Block 410 records, each time after receiving a request for accessing a designated network service, a time of receiving the request and information of a terminal and a user associated with the request sent.

This block is the same as block 310 of the third embodiment.

Block 420 computes, for each user who is monitored, statistical values associated with requests sent from the user in real time, which includes a value for a frequency of appearance of terminals obtained from an analysis of the terminals that are used by the user to send the requests.

In an embodiment, a value for a frequency of appearance of terminals is represented as the number of different terminals used by a user to send requests within a time window that has a set time duration. An end time of the time window is the time of receiving the most recent request sent by the terminal. For example, if the set time duration is ten seconds, and a user sends requests via terminals A, B, A, B, C and D within that ten seconds, a value for the frequency of appearance of terminals is four. If a corresponding threshold for the frequency of appearance of terminals is less than or equal to three, the user is determined to be abnormal. Otherwise, the user is determined to be normal. The present disclosure is not limited to this representation. For example, a time window may be used in form of a fixed time window.

There may be multiple values for the frequency of appearance of terminals as described above. Different time durations may be set for different values for frequencies of terminal appearance, and corresponding thresholds for the number of terminals can be different. Moreover, similar to a request frequency value, a value for a frequency of appearance of terminals may be represented as a time duration that has lapsed for the number of terminals used by a user to send requests reaching a set number of terminals.

Block 430 determines that the user is abnormal if the value for the frequency of appearance of terminals via which the user sends the requests is greater than the corresponding threshold for the frequency of appearance of terminals.

Upon determining that the user is abnormal, the process of isolation in the second embodiment may be used.

This embodiment also includes an alternative. In that alternative, the value for the frequency of terminal appearance is replaced by a value for a frequency of terminal switching obtained from an analysis of terminals used by the user to send the requests. The value for the frequency of terminal switching may be represented as the number of times that the terminals via which the user sends the requests are switched within a time window having a set time duration. An end time of the time window is the time of receiving the most recent request sent by the user. For example, a same user sends requests via terminals A, B, A, B, C and D, the value for the frequency of terminal switching corresponding to that user is five. If a corresponding threshold for the frequency of terminal switching is less than or equal to four, the user is determined to be abnormal. Otherwise, the user is normal. A difference between a value for a frequency of terminal switching and a value for a frequency of terminal appearance corresponding to a user is that a malicious program may send requests via a relatively few number of terminals under a same user, but may switch among these terminals frequently, which is also a scenario different from operations of users.

Fifth Embodiment

Studies have shown that a time interval between consecutive requests sent by a same user operating a terminal is generally not too short in practice. On the contrary, a malicious computer program is able to send two requests in a very short time interval. If a time interval between consecutive requests is very short, a determination may be made that a malicious computer program is behind the operations.

Figure 5:
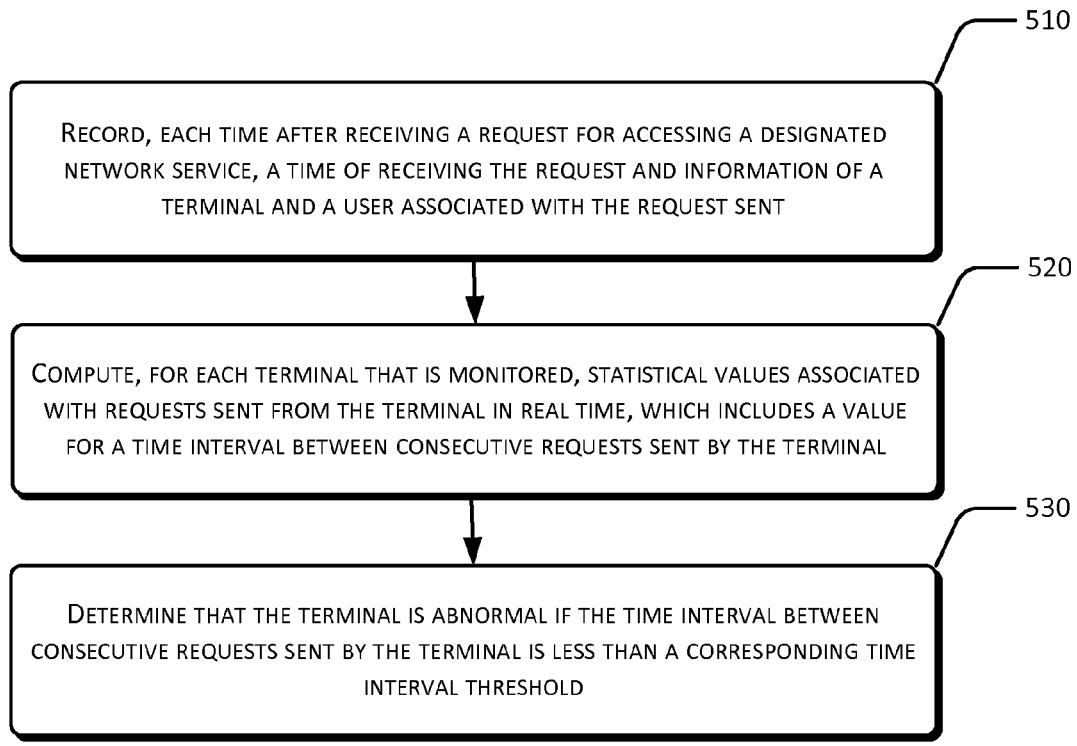
FIG. 5 is a flowchart illustrating a method of distinguishing between a human and a machine in accordance with a fifth embodiment of the present disclosure.
Figure 6:
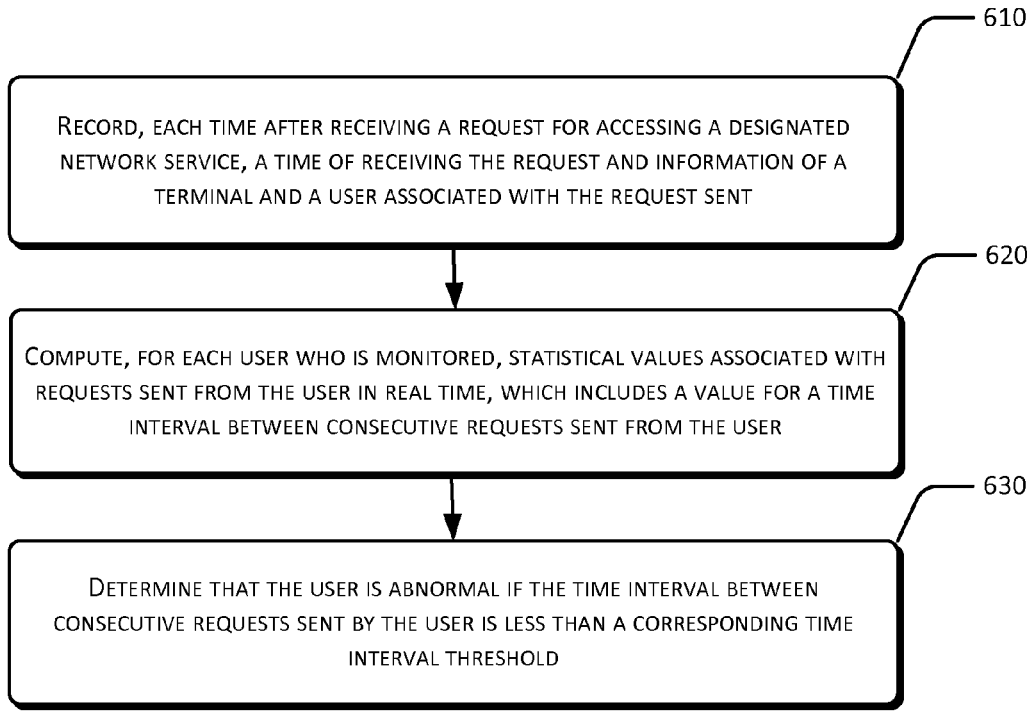
FIG. 6 is a flowchart illustrating a method of distinguishing between a human and a machine in accordance with a sixth embodiment of the present disclosure.

This example human-machine identification method is applicable in a service network, and achieves distinguishing between a human and a machine from a value for a time interval between consecutive requests sent by a terminal as shown in FIG. 5, which includes:

Block 510 records, each time after receiving a request for accessing a designated network service, a time of receiving the request and information of a terminal and a user associated with the request sent.

This block is the same as block 310 of the third embodiment.

Block 520 computes, for each terminal that is monitored, statistical values associated with requests sent from the terminal in real time, which includes a value for a time interval between consecutive requests sent by the terminal.

Values for time intervals between consecutive requests during a user operation are not the same in different situations. For example, two requests that are consecutive may be requests for a same network service (a user consecutively clicking a same icon) or may be requests for different network services (the user consecutively clicking different icons). Taking into account of a time interval between consecutive clicks by a user on a same icon is normally shorter, a time interval threshold corresponding to consecutive requests that ask for a same network service may be set to be less than a time interval threshold corresponding to consecutive requests that ask for different network services. Similarly, if consecutive requests of a terminal are sent from a same user, a corresponding time interval threshold may be set to be less than a time interval threshold corresponding to consecutive requests sent by different users. An unusual scenario in which different users operate on a same terminal at the same time is not considered.

In other words, in this embodiment, consecutive requests sent by a terminal are classified into multiple types based on whether the consecutive requests are sent from a same user and/or whether the consecutive requests are requests for a same network service, and a time interval threshold is individually set up for each type of consecutive requests. Specifically, if classification is made based on whether two consecutive requests are requests for a same network service, consecutive requests sent by a terminal can be classified as consecutive requests for a same service and consecutive requests for different services. If classification is made based on whether two consecutive requests are sent from a same user, the consecutive requests can be classified as requests associated with a same user and a same machine and requests associated with different users and a same machine, wherein a same machine corresponds to a same terminal. If classification is made based on whether two consecutive requests are sent from a same user and are requests for a same network service, the consecutive requests can be classified as consecutive requests associated with a same user and a same machine for a same service, consecutive requests associated with a same user and a same machine for different services, consecutive requests that associated with different users and a same terminal for a same service, and consecutive requests associated with different users and a same machine for different services. In another embodiment, consecutive requests are not divided into types, and only one time interval threshold is set up correspondingly.

In this block, each time when a request sent from the terminal is received, a time interval between this request and a previous request sent by the terminal is calculated for subsequent comparison.

Block 530 determines that the terminal is abnormal if the time interval between consecutive requests sent by the terminal is less than a corresponding time interval threshold.

Upon determining that the terminal is abnormal, the process of isolation in the first embodiment may be used. In other example embodiments, taking into account that a certain time interval or certain time intervals between consecutive requests sent during operation(s) of a user may be relatively short (though this situation is rare) and this situation frequently occurs when requests sent by a malicious computer program, the number of anomalies is set to be two or more than two in this embodiment. As such, the time interval threshold does not need to be set at an especially low value.

Sixth Embodiment

The principle of this embodiment is basically the same as that of the fifth embodiment, and the only difference is to achieve identification between humans and machines from a value for a time interval between consecutive requests sent by a user. As shown in FIG. 5, this human-machine identification method includes:

Block 610 records, each time after receiving a request for accessing a designated network service, a time of receiving the request and information of a terminal and a user associated with the request sent.

Block 620 computes, for each user who is monitored, statistical values associated with requests sent from the user in real time, which includes a value for a time interval between consecutive requests sent from the user.

Similar to the fifth embodiment, in this embodiment, consecutive requests sent from a user are classified into multiple types based on whether these two requests are sent via a same terminal and/or whether these two requests are requests for a same network service, and a value of a time interval threshold for each type of consecutive requests is set up individually. Specifically, consecutive requests sent by a terminal may be classified as: requests for a same service and requests for different services; consecutive requests associated with a same user and a same machine and consecutive requests associated with a same user and different machines; or consecutive requests associated with a same user and a same machine for a same service, consecutive requests associated with a same user and a same machine for different services, consecutive requests associated with a same user and different machines for a same service, and consecutive requests associated with a same user and different machines for different services.

In this block, each time when a request sent from the user is received, a time interval between this request and a previous request sent by the user is calculated for subsequent comparison.

Block 630 determines that the user is abnormal if the time interval between consecutive requests sent by the user is less than a corresponding time interval threshold.

Upon determining that the terminal is abnormal, the process of isolation in the first embodiment may be used. Similar to the fifth embodiment, a predetermined number of anomalies may be set to be two or more than two.

Methods of distinguishing a human and a machine in the present disclosure are described using the above embodiments. It should be noted that the technical means in these embodiments can be implemented in any combination thereof. For example, in one embodiment, both a statistical value associated with requests sent by a terminal and a statistical value associated with requests sent by a user may be computed, and distinguishing between a human and a machine is performed based on both the statistical value associated with the terminal and the statistical value associated with the user. In another example, for a statistical value associated with a terminal, the statistical value to be used may include one or more of a value for a frequency of adjustment, a value for a frequency of appearance of users, a value for a frequency of switching users and a value for a time interval between consecutive requests. For a user, a statistical value may include one or more of: a value for a frequency of adjustment, a value for a frequency of appearance of terminals, a value for a frequency of switching terminals and a value for a time interval between consecutive requests. The A threshold value corresponding to each statistical value may be selected based on a real situation, e.g., according to comparison and analysis with respect to activities associated with attacks and activities associated with user operations. The present disclosure is not limited thereto.

Seventh Embodiment

Figure 7:
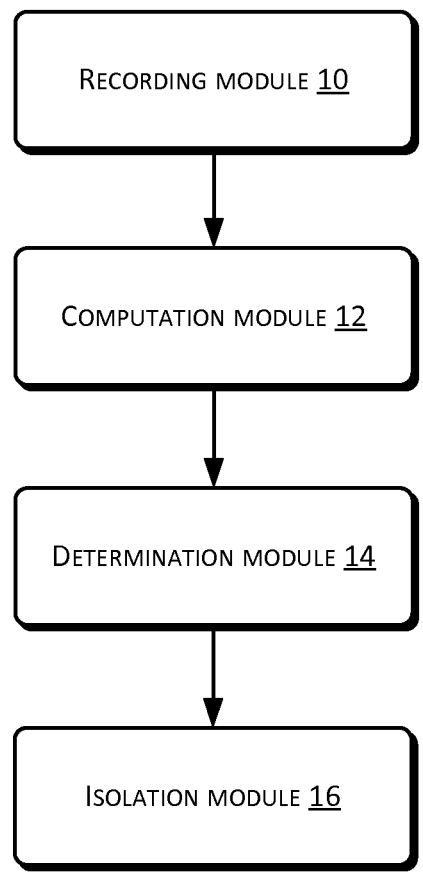
FIG. 7 is a functional block diagram illustrating a system of distinguishing between a human and a machine in accordance with a seventh embodiment of the present disclosure.

As shown in FIG. 7, this embodiment provides a human-machine identification system for implementing the method of distinguishing between a human and a machine in a service network, which includes:

a recording module 10 used for, each time when a request for accessing a designated network service is received, recording information of the request which includes a time of receipt of the request and information of a terminal and/or a user that sends the request, wherein the designated network service refers to all or a portion of the types of network services;

a computation module 12 used for, for each terminal and/or each user, computing a statistical value of requests sent by the terminal and/or a statistical value of requests sent by the user in real time based on a record, and upon determining the terminal and/or the user to be abnormal by a determination module and if an isolation module has not isolated the terminal and/or the user, excluding request(s) sent from the terminal and/or the user prior to a current instance of anomaly when computing the statistical value of the requests sent from the terminal and/or the statistical value of the requests sent from the user in real time;

the determination module 14 used for determining the terminal and/or the user to be abnormal when the statistical value of the requests sent by the terminal and/or the statistical value of the requests sent by the user exceeds a predetermined normal range; and the isolation module 16, used for isolating the terminal and refraining from receiving a request from the terminal upon determining that the number of anomalies associated with the terminal reaches a predetermined number of anomalies, M, wherein M≥1; and isolating the user and refraining from receiving a request from the user upon determining that the number of anomalies associated with the user reaches a predetermined number of anomalies, N, wherein N≥1.

These modules are logical modules that can be situated in a same entity or distributed in different entities. The functionalities of these modules can be referenced to corresponding descriptions in the foregoing embodiments, and are not redundantly described herein.

In an embodiment, the statistical value of the requests sent by the terminal, which is computed by the computation module 12 in real time, includes one or more of the following statistical values:

one or more request frequency values, with the predetermined normal range being exceeded when a request frequency value is greater than a corresponding request frequency threshold;

a value for a frequency of user appearance obtained from an analysis of users who send requests via the terminal, with the predetermined normal range being exceeded when the value for the frequency of user appearance is greater than a corresponding threshold for the frequency of user appearance;

a value for a frequency of user switching obtained from the analysis of the users who send the requests via the terminal, with the predetermined normal range being exceeded when the value for the frequency of user switching is greater than a corresponding threshold for the frequency of user switching; and a value for a time interval between consecutive requests sent from the terminal, with the predetermined normal range being exceeded when the value for the time interval value is less than a corresponding time interval threshold.

In other example embodiments, the statistical value of the requests sent by the user, which is computed by the computation module 12 in real time, includes one or more of the following statistical values:

one or more request frequency values, with the predetermined normal range being exceeded when a request frequency value is greater than a corresponding request frequency threshold;

a value for a frequency of terminal appearance obtained from an analysis of terminals used by the user when sending requests, with the predetermined normal range being exceeded when the value for the frequency of terminal appearance is greater than a corresponding threshold for the frequency of terminal appearance;

a value for a frequency of terminal switching obtained from the analysis of the terminals used by the user when sending the requests, with the predetermined normal range being exceeded when the value for the frequency of terminal switching is greater than a corresponding threshold for the frequency of terminal switching; and a value for a time interval between consecutive requests sent from the user, with the predetermined normal range being exceeded when the value for the time interval value is less than a corresponding time interval threshold.

Methods of representing and computing these statistical values can be referenced to the example methods, and are not redundantly described herein.

Figure 8:
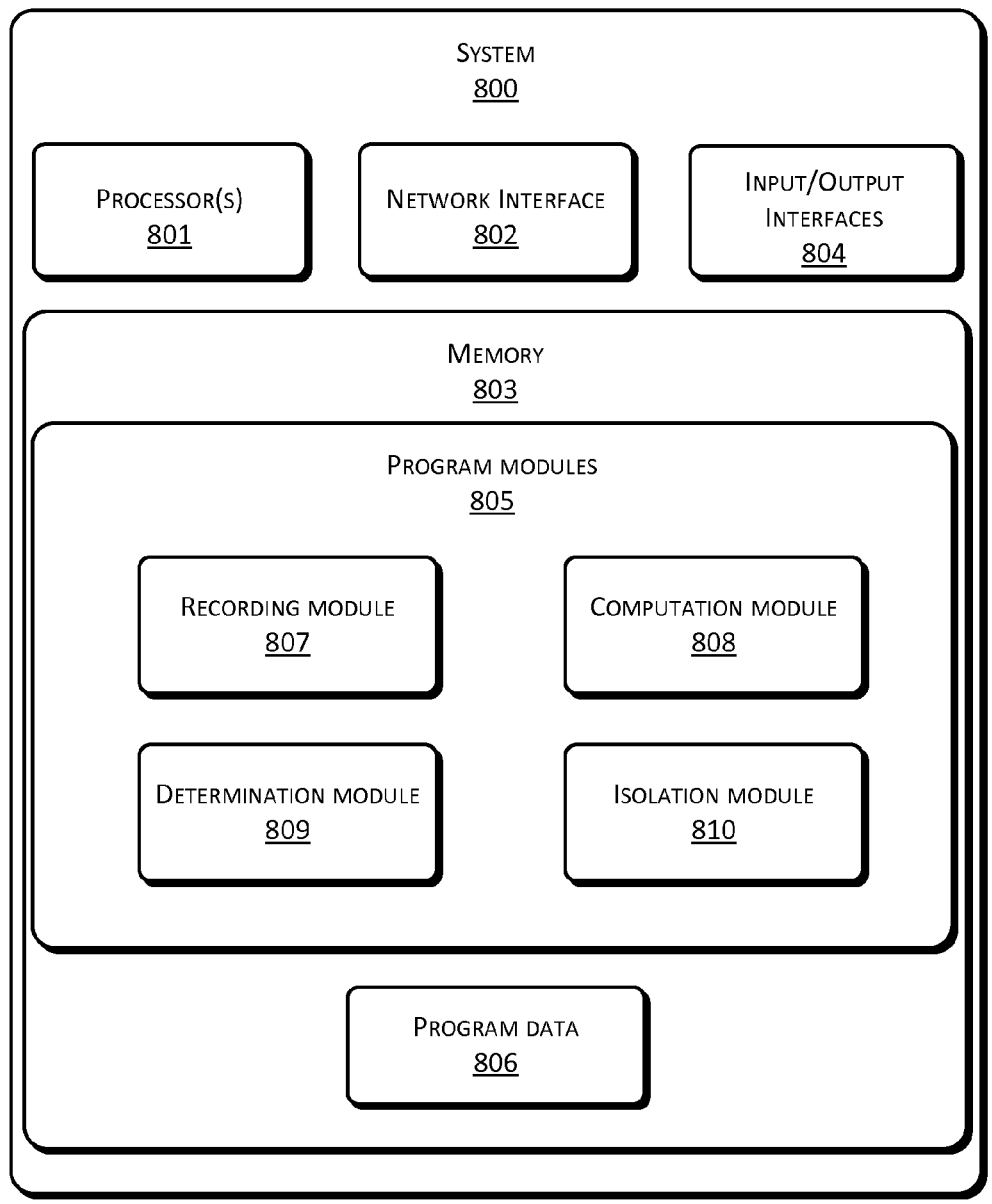
FIG. 8 is a structural diagram illustrating the example system as described in FIG. 7.

FIG. 8 illustrates an example system 800, such as the system as described above, in more detail. In one embodiment, the system 800 can include, but is not limited to, one or more processors 801, a network interface 802, memory 803, and an input/output interface 804.

The memory 803 may include computer-readable media in the form of volatile memory, such as random-access memory (RAM) and/or non-volatile memory, such as read only memory (ROM) or flash RAM. The memory 803 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 803 may include program modules 805 and program data 806. In one embodiment, the program modules 805 may include a recording module 807, a computation module 808, a determination module 809 and an isolation module 810. Details about these program modules may be found in the foregoing embodiments described above.

A person of ordinary skill in the art can understand that that all or part of the foregoing methods can be performed by a program that instructs a relevant hardware component. The program may be stored in a computer-readable storage medium, such as read-only memory, a magnetic disk, or an optical disk. Optionally, all or part of the foregoing embodiments may be implemented using one or more integrated circuits. Accordingly, each module/unit of the foregoing embodiments may be implemented in form of hardware or software functional modules. The present disclosure is not limited to any particular forms of combination of hardware and software.

Described above are merely example embodiments of the present disclosure, and should not be construed as limitation of the present disclosure. For one skilled in the art, the disclosed methods and systems can accommodate a variety of changes and modifications. Any changes, equivalents and improvements, etc., that are within the spirit and principles of the present disclosure, are covered under the protection of the present disclosure.

What is claimed is:

1. A computer-implemented method, the method performed by one or more processors and a memory communicatively coupled with the one or more processors, the memory having instructions, which when executed cause the processors to perform the steps, comprising:
    recording, when a request for accessing a designated network service is received, information of the request which includes a time of receiving the request and information of an access object that sends the request, the information of the access object including information of a terminal and the user associated with sending the request;
    computing in real time a statistical value of requests sent by the access object based on a record, the statistical value of the requests includes statistical value of requests sent by the terminal and by the user;
    determining that the access object is abnormal in response to the statistical value of the requests sent by the access object falling outside a predetermined normal range;
    determining whether the access object is a user or a terminal; and
    in response to determining that the access object is a terminal, isolating the terminal, refraining from receiving a request from the terminal, and stopping to compute the statistical value of the requests sent from the terminal upon determining that a number of anomalies associated with the terminal reaches a predetermined number of anomalies, M, wherein M=1 or M>1; or
    in response to determining that the access object is a user, isolating the user, refraining from receiving a request from the user, and stopping to compute the statistical value of the requests sent from the user upon determining that a number of anomalies associated with the user reaches a predetermined number of anomalies, N, wherein N=1 or N>1.

2. The computer-implemented method of claim 1, wherein:
    the statistical value of the requests sent by the access object includes one or more request frequency values; and
    the statistical value of the access object falls outside the predetermined normal range when a request frequency value thereof is greater than a corresponding request frequency threshold.

3. The computer-implemented method of claim 2, wherein:
    a request frequency value is represented as a number of requests sent within a time window that has a configured time duration, a time of receiving a most recent request sent from the access object being set as an end time of the time window; or the request frequency value is represented as a time duration used by a configured number of requests that are consecutively sent, and the configured number of requests includes the most recent request sent from the access object; and
    the request frequency values correspond to different configured time durations or different configured numbers of times, and respective number-of-times thresholds or time duration thresholds are accordingly different.

4. The computer-implemented method of claim 1, wherein in response to determining that the access object is a terminal:
    the statistical value of the requests sent by the terminal includes a value for a frequency of user appearance and/or a value for a frequency of user switching obtained from an analysis of users who sent the requests via the terminal; and
    the statistical value of the requests sent by the terminal falls outside the predetermined normal range when the value for the frequency of user appearance is greater than a first threshold for the frequency of user appearance, and/or the value for the frequency of user switching is greater than a second threshold for the frequency of user switching.

5. The computer-implemented method of claim 4, wherein:
    the value for the frequency of user appearance is represented as a number of different users who sent one or more requests via the terminal within a time window having a configured time duration, and the value for the frequency of user switching is represented as a number of times that the users who sent the one or more requests via the terminal are switched within the time window having the configured time duration, wherein an end time of the time window is a time of receiving a most recent request sent from the terminal.

6. The computer-implemented method of claim 1, wherein in response to determining that the access object is a user:
    the statistical value of the requests sent by the user further includes a value for a frequency of terminal appearance and/or a value for a frequency of terminal switching obtained from an analysis of terminals that are used by the user when sending the requests; and
    the statistical value of the requests sent by the user falls outside the predetermined normal range when the value for the frequency of terminal appearance is greater than a first threshold for the frequency of terminal appearance and/or the value for the frequency of terminal switching is greater than a second threshold for the frequency of terminal switching.

7. The computer-implemented method of claim 6, wherein:
    the value for the frequency of terminal appearance is represented as a number of different terminals used by the user to send one or more requests within a time window that has a configured time duration; and the value for the frequency of terminal switching is represented as a number of times that the user switch the terminals to send a plurality of requests within the time window that has the configured time duration, wherein an end time of the time window is a time of receiving a most recent request sent by the user.

8. The computer-implemented method of claim 1, wherein:
    the statistical value of the requests sent by the access request includes a value for a time interval between consecutive requests sent by the access object; and the statistical value falls outside the predetermined normal range when the value for the time interval is less than a corresponding time interval threshold.

9. The computer-implemented method of claim 8, wherein:
the consecutive requests sent by the access object are classified into different types based on whether the consecutive requests are sent by a same access object and/or whether the consecutive requests correspond to requests for a same network service, wherein a time interval threshold is individually set up for each different type of consecutive requests.

10. The computer-implemented method of claim 1, wherein:
upon determining the access object to be abnormal, if the access object has not been isolated, excluding request(s) sent from the access object prior to a current instance of anomaly when computing the statistical value of the requests sent from the access object in real time.

11. A system comprising:
one or more processors; and
a memory communicative coupled with the one or more processors, the memory having instructions, which when executed cause the processors to perform the acts, comprising:
recording, when a request for accessing a designated network service is received, information of the request which includes a time of receipt of the request and information of an access object that sends the request, the information of the access object including information of a terminal and a user associated with sending the request;
computing a statistical value of requests sent by the access object in real time based on a record, the statistical value of the requests includes statistical value of requests sent by the terminal and by the user;
determining the access object to be abnormal in response to the statistical value of the requests sent by the access object exceeding a predetermined normal range;
determining whether the access object is a user or a terminal; and
in response to determining that the access object is a terminal, isolating the terminal, refraining from receiving a request from the terminal, and stopping to compute the statistical value of the requests sent from the terminal upon determining that a number of anomalies associated with the terminal reaches a predetermined number of anomalies, M, wherein M=1 or M>1; or
in response to determining that the access object is a user, isolating the user, refraining from receiving a request from the user, and stopping to compute the statistical value of the requests sent from the user upon determining that a number of anomalies associated with the user reaches a predetermined number of anomalies, N, wherein N=1 or N>1.

12. The system of claim 11, wherein in response to determining that the access object is a terminal, the statistical value of the requests sent by the access object, which is computed in real time, includes one or more statistical values comprising:
one or more request frequency values, with the predetermined normal range being exceeded when a request frequency value is greater than a corresponding request frequency threshold;
a value for a frequency of user appearance obtained from an analysis of users who sent requests via the terminal, with the predetermined normal range being exceeded when the value for the frequency of user appearance is greater than a corresponding threshold for the frequency of user appearance;
a value for a frequency of user switching obtained from the analysis of the users who sent the requests via the terminal, with the predetermined normal range being exceeded when the value for the frequency of user switching is greater than a corresponding threshold for the frequency of user switching; and
a value for a time interval between consecutive requests sent from the terminal, with the predetermined normal range being exceeded when the value for the time interval value is less than a corresponding time interval threshold.

13. The system of claim 11, wherein in response to determining that the access object is a user, the statistical value of the requests sent by the access object, which is computed in real time, includes one or more statistical values comprising:
one or more request frequency values, with the predetermined normal range being exceeded when a request frequency value is greater than a corresponding request frequency threshold;
a value for a frequency of terminal appearance obtained from an analysis of terminals used by the user when sending requests, with the predetermined normal range being exceeded when the value for the frequency of terminal appearance is greater than a corresponding threshold for the frequency of terminal appearance;
a value for a frequency of terminal switching obtained from the analysis of the terminals used by the user when sending the requests, with the predetermined normal range being exceeded when the value for the frequency of terminal switching is greater than a corresponding threshold for the frequency of terminal switching; and
a value for a time interval between consecutive requests sent from the user, with the predetermined normal range being exceeded when the value for the time interval value is less than a corresponding time interval threshold.

14. The system of claim 11, wherein:
the statistical value comprises one or more request frequency values;
a request frequency value is represented as a number of requests sent within a time window having a set time duration, and a time of receiving a most recent request sent from the access object is set as an end time of the time window; or the request frequency value is represented as a time duration used by a set number of requests that are consecutively sent, and the set number of requests includes the most recent request sent from the access object; and
the request frequency values correspond to different set time durations or different set numbers of times, and respective number-of-times thresholds or time duration thresholds are different accordingly.

15. The system of claim 11, wherein consecutive requests sent by the access object are classified into different types based on whether the consecutive requests are sent by a same access object and/or whether the consecutive requests correspond to requests for a same network service, and wherein a time interval threshold is individually set up for each different type of consecutive requests.

16. The system of claim 11, wherein:
upon determining the access object to be abnormal and if the access object has not isolated, excluding request(s) sent from the access object prior to a current instance of anomaly when computing the statistical value of the requests sent from the access object in real time.

17. One or more non-transitory computer-readable media storing executable instructions that, when executed by one or more processors, cause the one or more processors to perform acts comprising: each time when a request for accessing a designated network service is received, recording information of the request which include a time of receiving the request and information of an access object that sends the request, the information of the access object including information of a terminal and a user associated with sending the request; computing in real time a statistical value of requests sent by the access object based on a record, the statistical value of the requests includes statistical value of requests sent by the terminal and by the user; determining the access object to be abnormal in response to the statistical value of the requests sent by the access object falling outside a predetermined normal range; determining whether the access object is a user or a terminal; and in response to determining that the access object is a terminal, isolating the terminal, refraining from receiving a request from the terminal, and stopping to compute the statistical value of the requests sent from the terminal upon determining that a number of anomalies associated with the terminal reaches a predetermined number of anomalies, M, wherein M=1 or M>1; or in response to determining that the access object is a user, isolating the user, refraining from receiving a request from the user, and stopping to compute the statistical value of the requests sent from the user upon determining that a number of anomalies associated with the user reaches a predetermined number of anomalies, N, wherein N=1 or N>1.

18. The one or more non-transitory computer-readable media of claim 17, wherein in response to determining that the access object is a terminal: the statistical value of the requests sent by the access object includes one or more request frequency values; and the statistical value of the access object falls outside the predetermined normal range when a request frequency value thereof is greater than a corresponding request frequency threshold.

* * * * *